United States Patent [19]
Abrams et al.

[11] Patent Number: 4,757,268
[45] Date of Patent: Jul. 12, 1988

[54] ENERGY SCALABLE LASER AMPLIFIER

[75] Inventors: Richard L. Abrams, Pacific Palisades; Hans W. Bruesselbach, Calabasas; Concetto R. Giuliano, Malibu; Richard C. Lind, Woodland Hills; Monica L. Minden, Calabasas; Thomas R. O'Meara, Malibu; David A. Rockwell, Santa Monica; Ronald R. Stephens, Westlake Village, all of Calif.

[73] Assignee: Hughes Aircraft Company, Los Angeles, Calif.

[21] Appl. No.: 736,877

[22] Filed: May 22, 1985

[51] Int. Cl.$^4$ .......................... H01S 3/098; G01C 3/08
[52] U.S. Cl. ...................................... 330/4.3; 372/21; 372/33
[58] Field of Search .................. 330/4.3; 372/3, 6, 21, 372/25, 29, 33, 99; 350/354; 307/426, 430

[56] References Cited

U.S. PATENT DOCUMENTS

| | | | |
|---|---|---|---|
| 3,531,735 | 9/1970 | Collins et al. | |
| 4,005,935 | 2/1977 | Wang | 330/4.3 |
| 4,006,426 | 2/1977 | Lacaur | 330/4.3 |
| 4,060,769 | 11/1977 | Mallozzi et al. | 330/4.3 |
| 4,186,353 | 1/1980 | Boutneau | 330/4.3 |
| 4,191,928 | 3/1980 | Emmet | |
| 4,220,928 | 9/1980 | Bloom et al. | 330/4.3 |
| 4,233,571 | 11/1980 | Wang et al. | 330/4.3 |
| 4,321,550 | 3/1982 | Evtuhov | 330/4.3 |
| 4,321,551 | 3/1982 | Bleil et al. | |
| 4,328,464 | 5/1982 | Pivarotto | 330/4.3 |
| 4,344,042 | 8/1982 | Hon | 372/33 |
| 4,345,212 | 8/1982 | Seppala et al. | 330/4.3 |
| 4,493,086 | 1/1985 | Jain et al. | 372/21 |
| 4,507,787 | 3/1985 | Daly et al. | |

OTHER PUBLICATIONS

Fisher, R. A., "Optical Phase Conjugation", 1983, pp. 525, 527, 544, 546, 564, Chp. 10, Academic Press, Text.
Karr et al., "Intraresonated Phase Conjugation", 8/28/81, SPIE Proceedings, vol. 293, pp. 162-182.
Vanberzelle et a., "Pulse Compression . . . Mixing", 2/15/81, pp. 524-525, Appl. Opt., vol. 20, #4.
Guiliano et al., "Correction of Phase . . . Techniques", 3/79, pp. 1-135, NTIS AD-A066, 148/8, Hughes Labs.
N. G. Basov, I. G. Zubarev, A. B. Mironov, S. I. Mikhallov, and A. Yu. Okulov, Laser Interferometer with Wavefront-Reversing Mirrors, Sov. Phsy. JETP 52 (5), Nov. 1980, pp. 847-851.
N. G. Basov et al.: "Influence of Certain Radiation Parameters on Wavefront Reversal of a Pump Wave in a Brillouin Mirror", Soviet Journal of Quantum Electronics, vol. 9, No. 4, Apr. 1979, (American Institute of Physics, N.Y., U.S.), pp. 455-458.
I. D. Carr et al.: "Performance of a Nd:YAG Oscillator/Amplifier with Phase-Conjugation via Stimulated Brillouin Scattering", Applied Physics B. Photophysics and Lasar Chemistry, vol. 36, No. 2, Feb. 1985, (Berlin, Del.), pp. 83-92.

(List continued on next page.)

*Primary Examiner*—Nelson Moskowitz
*Attorney, Agent, or Firm*—V. D. Duraiswamy; Kenneth W. Float; A. W. Karambelas

[57] ABSTRACT

A laser apparatus (10) has a coherent master oscillator radiation source (30) for driving a plurality of laser gain elements (20) positioned in a operationally parallel configuration so as to receive unamplified radiation (40) from master oscillator (30) and transmitting amplified radiation (44). Input means (60) couples portion of radiation (40) from master oscillator to each of said gain elements (20). Phase conjugate reflector means (80) operatively coupled to gain elements (20) reflects the phase conjugate of amplified radiation (44) back into the gain elements (20) where it is further amplified. Output coupling means (90) couples amplified radiation from the plurality of gain elements (20) out of the laser apparatus as a single coherent output beam of radiation.

40 Claims, 8 Drawing Sheets

OTHER PUBLICATIONS

V. G. Manishin et al.: "Problem of Suppression of Interference Losses in Multichannel Resonators with Wavefront-Reversing Mirrors", Soviet Journal of Quantum Electronics, vol. 14, No. 6, Jun. 1984, (American Institute of Physics, N.Y., U.S.), pp. 818-821.

T. R. O'Meara: "Compensation of Laser Amplifier Trains with Nonlinear Conjugation Tecniques", Optical Engineering, vol. 21, No. 2, Mar./Apr. 1982, (Society of Photo-Optical Instrumentation Engineers, Bellingham, Wash., U.S.), pp. 243-251.

W. Streifer et al.: "Phased Array Diode Lasers", Laser Focus, vol. 20, No. 6, Jun. 1984, (Newton, Mass., U.S.), pp. 100-109.

J. Katz: "Semiconductor Optoelectronic Devices for Free-Space Optical Communications", IEEE Communications Magazine, vol. 21, No. 6, Sep. 1983, (IEEE, N.Y., U.S.), pp. 20-27.

ENERGY SCALABLE LASER AMPLIFIER

BACKGROUND OF THE INVENTION

This invention relates to lasers and more particularly to lasers utilizing phase conjugate reflectors. In addition, this invention relates to high energy lasers or laser systems having high volume amplifier stages with high average power output.

Many potential laser applications such as laser communications, fusion, and drivers for nonlinear harmonic convertors and Raman devices require the use of very high energy laser sources exhibiting high brightness. High brightness can be generally defined as high power per unit area per unit bandwidth per unit solid angle. However, high brightness output from lasers depends on many factors that are either hard to control or have known operational limits. This results in lasers that are unable to provide the desired brightness output using current methods and apparatus.

Possible limiting factors such as optical path length variations, optical element quality, reflective coating breakdown, or optical aberrations have been addressed by a variety of techniques. Among these are refined manufacturing techniques for media and optics, and employing deformable or phase conjugate mirrors. Examples of the latter two techniques are described in U.S. Pat. No. 3,967,899 issued to T. O'Meara and U.S. Pat. Nos. 4,233,571 issued to Wang et al. and 4,321,550 issued to Evtuhov. These techniques, among other things, confine radiation to preferred operating modes, and decrease degradation due to a variety of optical aberrations. However, these techniques do not address several problems associated with laser energy scaling.

One major problem with increasing the energy available from lasers is the fact that there is an inherent limit to the energy per unit volume that can be extracted from or stored in a lasing medium. Therefore, for high energy applications the volume of the laser must be increased in order to increase the energy available for output. Unfortunately there are limitations on simply increasing the laser medium volume.

In chemical lasers the medium can often exhibit thermal gradients or material flow problems leading to undesirable chemical reactions or breakdown and depletion zones. These problems are increasingly difficult to prevent for larger media volumes. Safety problems also arise for chemical media that require specialized packaging or cooling in higher volumes.

Solid-state or crystal-based lasers have limits to the size of media that can be manufactured. Some crystalline materials can not yet be grown in large volume boules. Materials such as Nd:YAG have inherent constraints that impose a size limit on the order of 12 mm in cross-section (diameter) before factors such as impurities or stress during growth degrade the medium to an unsatisfactory or unusable form. This size constraint limits the energy output from Nd:YAG to approximately 2 joules which is unacceptably low for many high brightness applications. In addition, crystalline materials may grow too slowly to provide practical production rates for manufacturing large volume laser media.

Even when larger media volumes are possible, the energy storage is limited by parasitic modes, and if these can be eliminated, ultimately always by amplified spontaneous emission (ASE). Parasitic modes or oscillations are supported by reflections from the surfaces of the media or nearby optics. Larger volumes allow more gain length for alternative optical modes within the lasing medium, decreasing the energy available for extraction by the desired primary, "power", mode.

Even if stray reflections and parasitic modes can be eliminated, the increased volume provides greater gain length for spontaneous emission. This leads to depletion of energy for the desired laser transitions. In addition, while ASE can be measured in a given volume it does not straight forwardly or directly scale with increasing volume. The inability to accurately infer an ASE limit from a small volume to larger volumes makes accurate prediction of large volume performance very difficult or imprecise.

While parasitic modes and spontaneous emission may either be partially controlled by various absorbing filters and judicious choices of geometry or polarizers, or possibly so weak as to be ignored for low level, small volume laser operation, it is clear they represent the fundamental limiting factor in high energy laser applications.

What is needed is a method or apparatus for increasing the volume of laser media in a given laser system without increasing the presence of degrading factors nor reaching inherent volumetric limitations.

One approach might be to position several lasers in parallel and sum the outputs in order to provide an overall higher energy beam. This approach produces an incoherent sum of the individual outputs, such that, in the best case, the total far field brightness of N parallel laser outputs is N times the brightness of a single output. On the other hand, if the individual laser outputs can be arranged to have a fixed phase relationship with one another, a coherent sum is produced in which case it is possible for the peak far field brightness to increase proportional to $N^2$. This highly desired situation can, in principle, be accomplished using one of two techniques.

First, there is the technique of evanescent coupling. This has been primarily applied in the area of diode lasers, although some lasers utilizing a fluid medium may have also incorporated this approach. In this technique, evanescent fields from adjacent laser channels interact to phase-lock the laser outputs from adjacent laser apertures. This is described in more detail in "Phased Array Diode Lasers" by W. Streifer, R. D. Burnham, T. L. Paoli and D. R. Scifres in *Laser focus/Electro-Optics*, June 1984. However, even though coupled through the evanescent fields, the output from adjacent laser channels may not be exactly in phase; adjacent channels usually operate in modes that are 180 degrees out of phase, producing a two-lobed far-field intensity distribution which is usually highly undesirable in device applications. The greatest brightness is achieved for parallel lasers that are coherently coupled with zero phase difference.

An alternate approach is to insert an electro-optical material in the optical path between each laser medium and the system output aperture. Applying a controlled voltage to the electro-optical material allows the alteration of the index of refraction and subsequently the speed of optical radiation traversing the material. This allows the adjustment of the phase of each laser relative to the others. However, the relative phase of a given laser output is dynamic; it changes over time due to factors affecting the laser medium optical path length such as temperature, stress, etc. In addition, one laser may need servicing or replacement and it is impossible to match exactly the old physical characteristics with the new laser because of inevitable physical length differences and compositional variations. Therefore, this technique would need to be dynamically adjustable to some minimal extent. This requires the use of specialized sensors, controls, electronics and programming. Such complexity is both impractical and unreliable for many applications.

What is needed then is a method of combining the output of multiple laser gain elements to achieve higher brightness, high energy output without volumetric limitations, and to provide coherent coupling.

SUMMARY

Accordingly, it is a principal purpose of the present invention to provide high brightness, high energy lasers.

Another purpose of the present invention is to provide dynamic coherent coupling of multiple laser gain elements into a single output.

A further purpose of the present invention is to provide a high brightness laser using lasing media having volume constraints.

Yet another purpose of the invention is to provide a high brightness solid-state laser.

Still another purpose of the invention is to provide a high brightness laser using a laser diode array.

These and other purposes are accomplished by providing a laser comprising a master oscillator radiation source driving a plurality of laser gain elements positioned in an operationally parallel arrangement. The master oscillator comprises a high quality coherent radiation source which can be a laser. Input means are provided for coupling radiation from the master oscillator into the gain elements. Phase conjugation means disposed along an optical path beyond the gain elements receives amplified radiation from the gain elements and returns the phase conjugate of the radiation thereto. Output coupling means disposed between the master oscillator and the laser gain elements couples amplified radiation out of the laser as a single beam of radiation. The output beam of radiation comprises radiation that has been amplified by two traversals of the gain elements.

In accordance with a preferred embodiment, the master oscillator is made to operate in a single linear polarization, the input means for the laser is a polarizing beam splitter, and the output means comprises a polarization modification means. The polarization modification means rotates the polarization of the amplified radiation by 90 degrees with respect to the unamplified input radiation. This causes the amplified radiation to be directed out of the laser and not be reflected or passed into the master oscillator by the polarizing beam splitter. Suitable polarization rotation means can be Faraday rotators and suitable circular polarization devices are quarter-wave plates.

In one aspect of the invention, the laser gain elements in the laser are positioned so as to form an N by M two dimensional array. The individual laser gain elements in such an array can be media including glasses, solid-state crystals, gases, dyes, or a variety of chemical media. The individual gain elements, through the use of spectrally selective filters or other means, are isolated from each other at the lasing wavelength. Thus, the ASE limit is that of the individual elements rather than the entire volume.

In order to assist in coupling radiation into the laser gain elements from the master oscillator, the laser can further comprise input transfer means. Suitable input transfer means can comprise a plurality of reflective surfaces such as mirrors or reflective prisms.

In another aspect of the invention focusing means are provided to assist in the coupling of radiation from the laser gain elements to the phase conjugation means. Conjugate transfer means can also be provided along the optical path between the laser gain elements and the phase conjugation means for coupling radiation between the laser gain elements and the phase conjugation means. Suitable transfer means can comprise a plurality of reflective prisms or one or more lenses arranged so as to intercept radiation from each laser gain element and reflect it into the phase conjugation means.

The phase conjugation means comprises such apparatus as a Stimulated Brillouin Scattering cell, Simulated Raman Scattering cells or a four-wave mixer. The phase conjugation means can further comprise optical waveguides exhibiting phase conjugation processes.

In one aspect of the invention the laser also includes collimation means positioned so as to expand the radiation from the master oscillator so that it is directed to each of the laser gain elements.

In further aspects of the invention, the laser gain media includes solid-state crystals chosen from the group Nd:YAG, Nd:YLF, Nd:YA10, Co:MgF2, Cr:Nd:GSAG, or Ti:sapphire. The laser gain media is subdivided into a plurality of crystals that are configured together to form an N by M array.

In yet another aspect of the invention, the laser gain media comprises an array of laser diode apertures constructed on a single supporting substrate. Alternatively, the entire laser comprises optical and electro-optical elements deposited on a single supporting substrate.

DESCRIPTION OF THE DRAWINGS

The novel features of this invention, as well as the invention itself, will be best understood from the accompanying description taken in connection with the accompanying drawings in which like reference characters refer to like parts and in which.

DETAILED DESCRIPTION

The invention comprises a method and apparatus for the coherent coupling of two or more laser gain elements to produce a single output waveform or pulse whose cross sectional area is approximately the sum of the individual laser gain element output areas. The laser gain elements are driven by a master oscillator radiation source and have the output radiation from a first amplification pass, phase conjugated and returned through the laser gain elements in a second pass and coherently coupled to achieve the single output. This results in a high brightness output.

Figure 1:
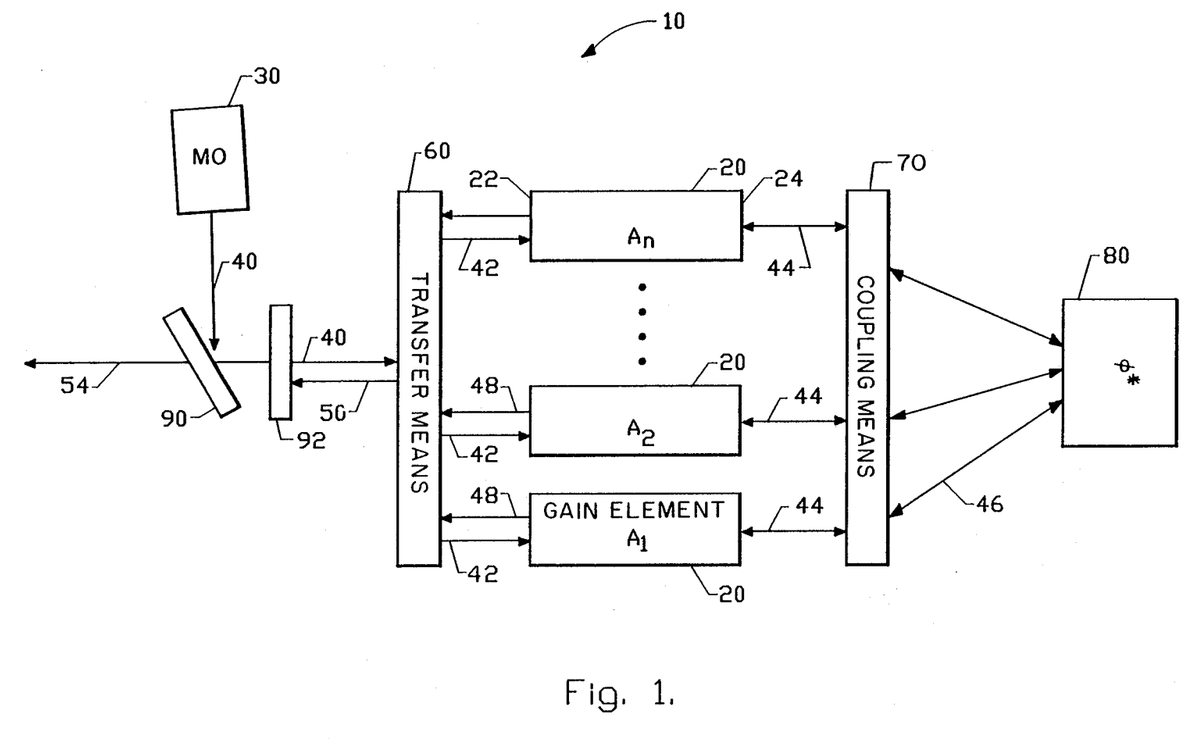
FIG. 1 illustrates a schematic of a high brightness laser system constructed according to the principles of the invention.

Referring to FIG. 1, a schematic illustration of a laser 10 comprising two or more laser gain elements 20, which are labeled as $A_1$, and $A_2$ to $A_N$ is shown. Laser gain elements 20 are positioned adjacent to each other and optically driven or pumped by a pulse or pulses 40 from a master oscillator 30. The master oscillator (MO) power amplification (PA) arrangement is known as a MOPA configuration.

The gain elements 20 have their respective individual optical paths connected in parallel in laser 10. It is not necessary, however, for the individual gain elements 20 to be mounted physically parallel or immediately adjacent to each other. While physically parallel elements are contemplated by the embodiments illustrated herein, other arrangements can be used. Depending on the specific application, physical parameters and support structures available, a physically nonparallel arrangement may be dictated in order to provide as many laser gain elements 20 into a single laser 10 as desired. An example might be a communications satellite having a circular payload area requiring evenly distributed weight.

Master oscillator 30 can comprise a variety of coherent radiation sources known in the art such as, but not limited to, Nd:YAG crystals or diode lasers. The selection of a radiation source for master oscillator 30 is determined by system or application requirements such as desired output wavelengths, threshold energies for laser gain elements 20, and spectral purity. It is preferred that master oscillator 30 produces a diffraction limited output although the output may require collimation as described below.

Master oscillator 30 provides radiation, at a predetermined and desired wavelength, which is directed into the amplifying media of laser gain elements 20 through apertures 22. The radiation is preferrably provided as a pulse or series of pulses, but cw operation may be possible depending on the media and operating parameters of laser gain elements 20 and oscillator 30, and depending on the properties of the phase conjugate mirror employed. The remaining discussion of preferred embodiments will assume radiation in the form of pulses.

In order to direct radiation pulses 40 to apertures 22 and into laser gain elements 20, an optical transfer means 60 can be provided which splits the input radiation pulses 40 into input pulses 42 and directs them into individual laser gain elements 20. Transfer means 60 comprises optical elements known in the art such as, but not limited to, a series of mirrors or reflective prisms.

Figure 2A:
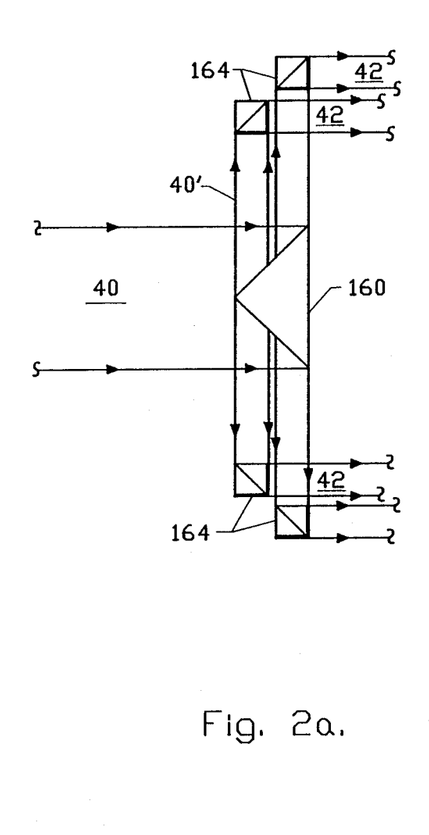
FIG. 2 illustrates several alternative input means for use in the laser of FIG. 1.
Figure 2B:
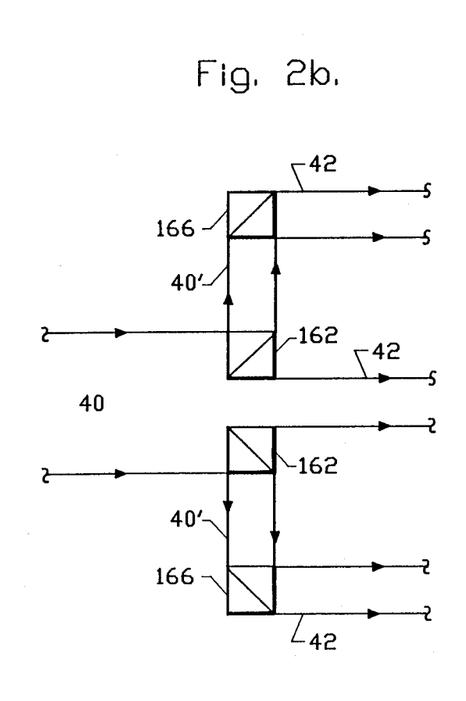
Figure 2C:
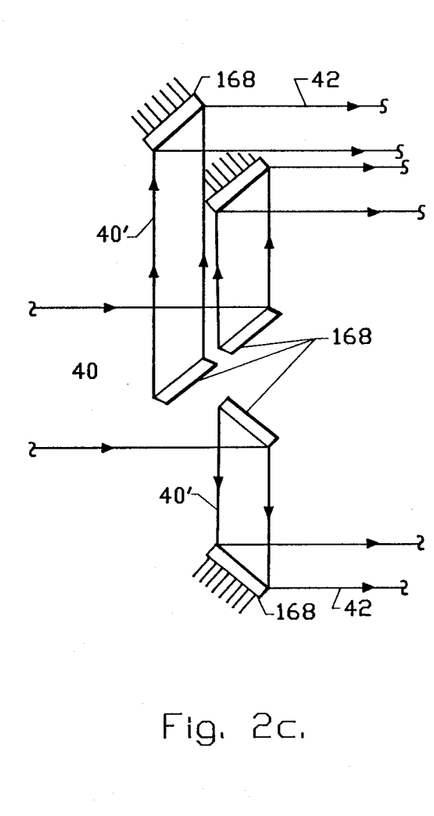

Some exemplary arrangements for optical elements comprising transfer means 60 are illustrated further in FIG. 2. In FIG. 2a, transfer means 60 comprises a reflective prism 160 which redirects pulses 40 into two separate pulse trains 40' which are further reflected by prisms 164 into laser gain elements 20 as pulses 42. In FIG. 2b, prism 160 is replaced with a series of prisms 162 which intercept predetermined portions of pulses 40 and redirect them to prisms 166. In this embodiment, a portion of pulses 40 will continue along the same optical path to gain elements centrally located between those receiving pulses from prisms 166. In FIG. 2c, the prisms 162 and 166 are replaced by reflective surfaces or mirrors 168.

In principle, a series of beam splitters can be used to intercept and redirect a predetermined portion of input pulses 40 to each of laser gain elements 20. However, V. G. Manishin and G. A. Pasmanik in "Problem of Suppression of Interference Losses in Multichannel Resonators with Wavefront-Reversing Mirrors," *Soviet Journal of Quantum Electronics*, Vol. 14(6), page 818, have shown that this technique requires all of the laser gain elements to have essentially identical gain to prevent interference losses at each beam splitter. Such a stringent requirement is difficult to achieve in practical systems. Therefore, this is a less preferred approach. It is also possible to employ focusing lenses at the input of the laser gain elements, but this increases the complexity of the system and can actually insert undesirable losses and aberrations which are to be avoided.

Gain elements 20 can individually comprise a variety of laser gain elements or laser media. This includes dye lasers, chemical lasers, glasses and many solid-state crystals. Generally the media employed has the aforedescribed inherent limitations in volume scaling. However, the media need not comprise a material having special volumetric properties. All of the gain elements do not have to be identical media either, except that coherent coupling requires a substantially identical operating wavelength.

Gain elements 20 are illustrated schematically and do not show individual power supply connections, support hardware or other structure typically used to formulate such laser gain elements. These items are readily apparent to one skilled in the art and are more specifically described in the general literature.

The dimensional considerations for construction of laser gain elements 20 are not as stringent in laser 10 as in previous laser devices attempting to couple parallel gain elements. Phase differences produced by differing gain element optical path lengths and aberrations are automatically compensated in laser 10. As further discussed below the ability to compensate for the relative difference in optical path lengths and other physical parameters between gain elements 20 means that any element, or elements, 20 can change over time with respect to other elements and not degrade the laser 10 output. In addition, a given element or elements 20 can be replaced due to failure, maintainence, or system requirements and laser 10 dynamically adjusts for change in the gain element. This is one advantage this invention has over the prior art suggestion of electrooptical phase modulation previously discussed.

It should be noted that for clarity and purposes of illustration only, the series of gain elements 20 in FIG. 1 are only shown residing in one plane. The principles of the present invention are applicable to a two dimensional array of gain elements, say an N by M array of gain elements, all of whose outputs are combined to produce a single large area output and not simply a 1 by N planar shaped output. This is accomplished by positioning laser gain elements 20 in a two dimensional array and directing pulses 40 from master oscillator 30 through other transfer means 60' and into adjacent planes to drive the array of gain elements 20.

Each gain element 20 amplifies pulses 42 as they traverse gain elements 20, by processes understood in the art, producing amplified pulses 44 exiting through apertures 24 and traveling along an optical path extending away from transfer means 60. The amplified radiation or pulses 44 are now directed to a phase conjugate reflector or mirror 80, identified in the FIGS. as*.

In order to direct pulses 44 into phase conjugate reflector 80, an optical coupling means 70 can be provided along the optical path between gain elements 20 and reflector 80. This is especially applicable where the cross section or entrance aperture of the phase conjugate reflector is much smaller in area than the pulses 44 from gain elements 20. Coupling means 70 redirects pulses 44 into pulses 46 which enter phase conjugate reflector 80.

In practice, one skilled in the art may use several small optical elements in order to focus the radiation into phase conjugate reflector 80 such as several small lenses. However, it is preferred to minimize the number of discrete components used in order to minimize the degradation to the beam as well as extraneous losses and reflections. Additionally, optical elements have to be adjusted in terms of the optical cavity tuning and extra elements make this task increasingly complex. Exemplary elements for comprising optical coupling means 70 are those elements previously illustrated in FIG. 2 as well as large singular lenses.

In phase conjugate reflector 80, pulses 44 are temporally reflected back into gain elements 20 along the identical path the radiation comprising pulses 44 previously traversed. A phase conjugation reflector achieves this result through processes described in the previously discussed U.S. Pat. Nos. 4,233,571 and 4,321,550 as well as in references such as "Applications of Optical Phase Conjugation" by C. R. Giuliano, *Physics Today*, April 1981.

This use of phase conjugate reflector 80 allows further amplification of pulses 44 and provides a coherent coupling of the separate gain element outputs. This is accomplished by phase conjugation due to the fact that the radiation will traverse substantially the same path in returning through gain elements 20 as it did initially only in a temporally reversed sense. Therefore, any variation in optical length, media properties and aberrations that were impressed upon or folded into the waveform of pulses 44 and 46 will be subtracted back off by the time they emerge as again amplified pulses 48 and recombine into pulses 50 and a single output beam 54. Since the pulses began as a single source of radiation having no phase separation the final amplified pulses 50 will also return to this phase matched state due to the phase conjugation. Thus, coherent coupling of N amplified pulses takes place forming an output pulse whose intensity is proportional to $N^2$. This represents a great improvement over previous techniques.

The ability to remove the individual gain element characteristics from the amplified radiation also means any change in individual gain element optical path length properties are removed. This gives laser 10 the ability to dynamically adjust for gain element changes as previously discussed.

The specific apparatus comprising phase conjugate reflector 80 can be a variety of apparatus known in the art including, but not limited to, Stimulated Brilluoin Scattering (SBS) gas cells, Stimulated Raman Scattering cells, or crystals such as $BaTiO_3$. The process of phase conjugation functions roughly the same in each of these types of conjugating medium even though the mechanism by which it is achieved may differ.

The invention does not require the use of a specific phase conjugation medium or structure. However, for many applications one type of phase conjugate reflector may have characteristics that make its use more suitable. As an example, a preferred embodiment for the phase conjugation reflector is an SBS cell. This type of conjugator or medium is preferred because, unlike many phase conjugate reflectors, it does not require extra radiation sources for pumping the media which can be very energy inefficient. As an example, the pumping energy requirements for four-wave mixing increase with laser output energy. Also, the SBS process imposes a much smaller frequency shift on the pulses 46 than would occur with SRS. This frequency shift sets a limit on how well aberrations and optical path length differences can be compensated.

In additional, SBS cells function in a manner that greatly improves the ASE characteristics of laser 10. Since the SBS cell acts as a threshold device that requires a minimum amount of intensity before SBS reflection and phase conjugation take place, low intensity ASE pulses are not reflected. Therefore, ASE radiation is not returned to the amplifiers 20 and its intensity remains very small.

Once conjugate takes place in phase conjugation reflector 80, pulses 46 are reflected back through coupling means 70 and through apertures 24 into gain elements 20. Pulses 46 are again amplified during the second pass through gain elements 20 and exit through apertures 22 as pulses 48. The pulses 48 are transfered through transfer means 60 to form a single output pulse 50.

It is desirable to prevent amplified pulses 50 from entering master oscillator 30 where this could cause extreme damage to the lower power master oscillator. In order to provide optical isolation of master oscillator 30, pulses 40 can be polarized by using a polarizing beam splitter 90 and then means for modifying the polarization state of pulses 50. The polarization modification of pulses 50 can be accomplished using means such as, but not limited to, quarter-wave plates or Faraday rotators. The preferred embodiments herein are illustrated with quarter-wave plates. However, this technique is particularly applicable to the use of SBS media for phase conjugation. Four-wave mixing and some other types of phase conjugation processes induce polarization changes which require a different approach.

Figure 4:
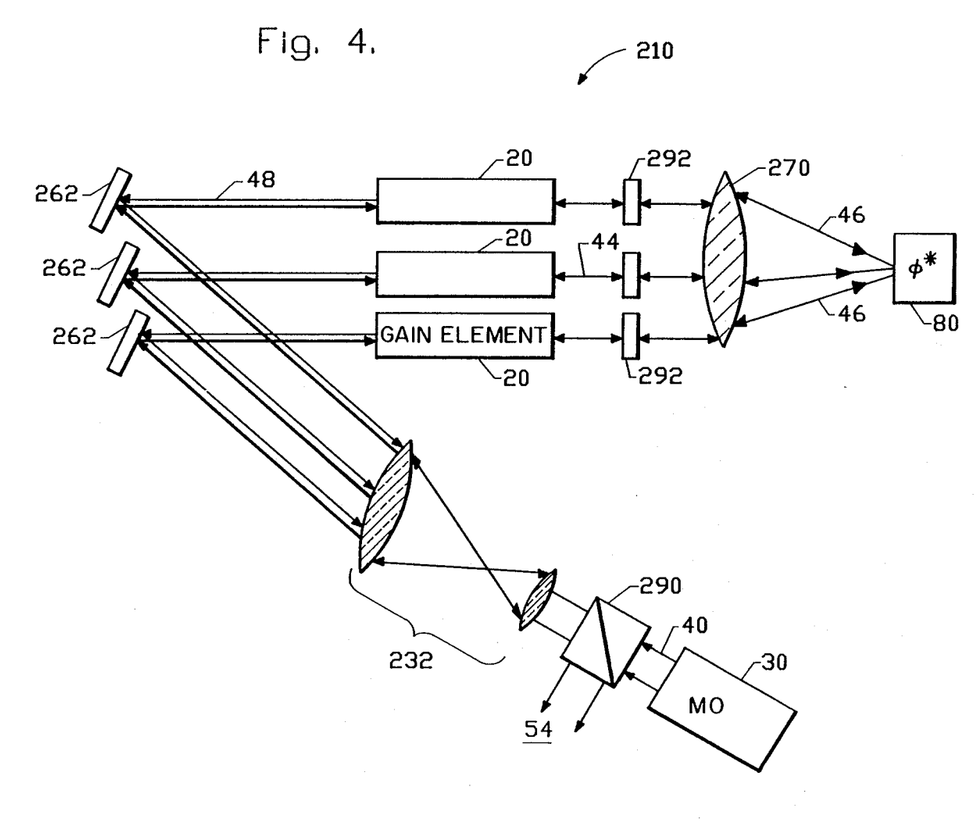
FIG. 4 illustrates a second embodiment of the laser of FIG. 1 in which the laser master oscillator introduces pulses directly along the gain element optical path.

While the embodiment of FIG. 1 utilizes a quarter-wave plate 92 adjacent to the beam splitter, it is not necessary that plate 92 be in this particular location. The quarter-wave plate can be positioned elsewhere in the optical path of pulses 40, 42, 44, 46, 48, or 50 and also be subdivided into a series of smaller quarter-wave plates 292 as shown in FIG. 4.

Figure 3:
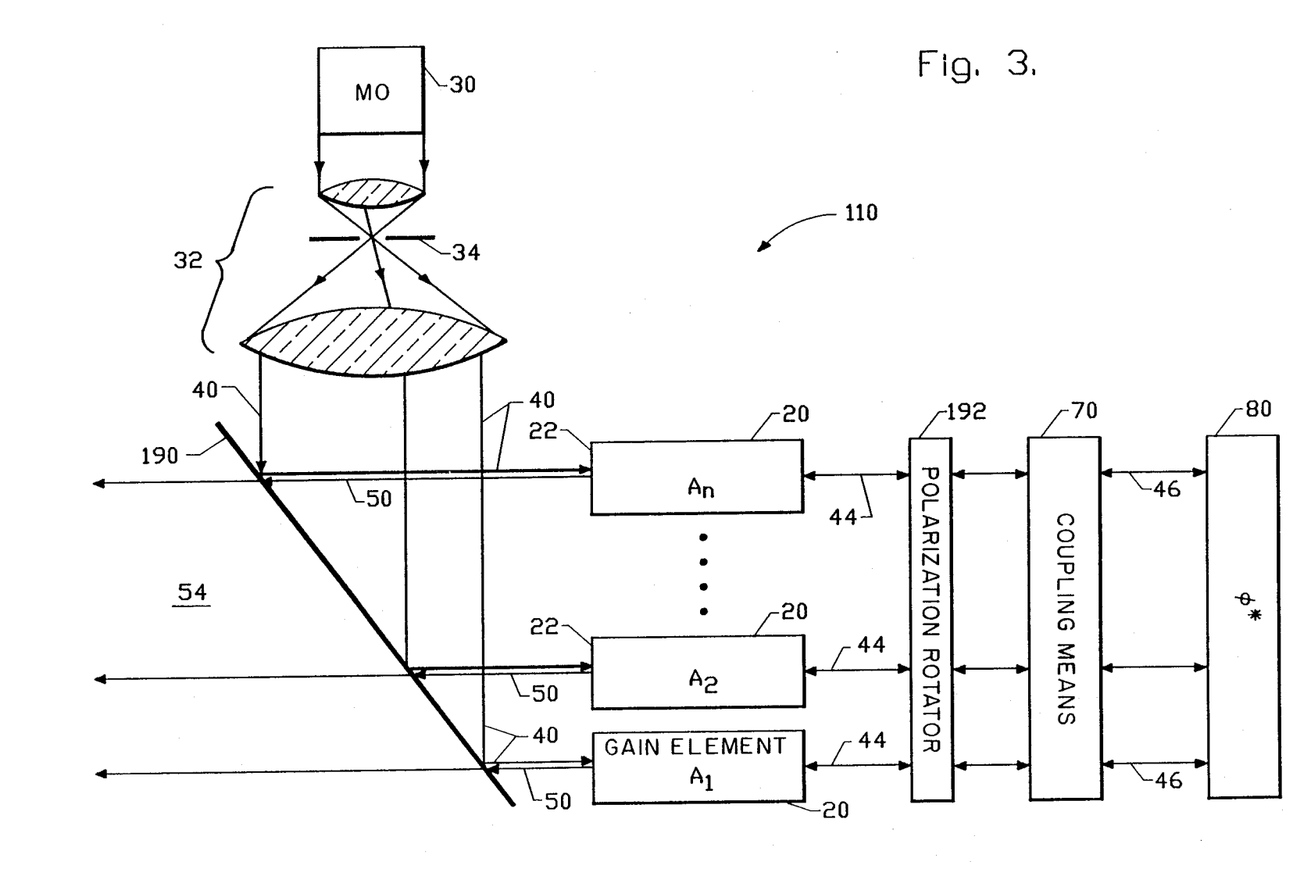
FIG. 3 illustrates an embodiment of the laser of FIG. 1 using a polarizing beam splitter as an input/output element and collimation of input pulses.

The principles of the present invention are further illustrated in FIG. 3 where a laser 110 is illustrated having laser gain elements 20 and a single input/transfer means 190. In FIG. 3, those elements having correspondence with FIG. 1 bear the same numerical designation, such as master oscillator 30, coupling means 70, and phase conjugate reflector 80. However, the function of previously described transfer means 60 and beam splitter 90 are combined into a single element, polarizing beam splitter 190.

The pulses of radiation leaving master oscillator 30 are expanded or collimated using a telescopic element or collimator 32 in order to provide a beam of pulses 40 having sufficient cross-section to engage all of the gain elements 20. This is done because master oscillator is a high quality near diffraction limited beam that is generally much smaller than the total area of apertures 22. Therefore, pulses 40 must be expanded and then amplified in a high quality manner in order to provide the final beam. However, in some applications master oscillator 30 may provide a sufficiently large beam for a sufficiently small number of gain elements so as not to require additional collimation.

Collimator 32 is formed from optical elements known in the art and commonly used for such optical pulse collimation. However, the chosen elements should provide as low an optical loss as possible in order to maintain the energy levels contemplated. In addition, a spatial filter 34 can be inserted into the optical elements forming collimator 32 in order to further prevent return of amplified radition into the master oscillator or improve spatial beam quality.

After collimation, pulses 40 are intercepted and redirected by reflection to gain elements 20 by polarizing beam splitter 190. Pulses 40 are amplified and become pulses 44, 46, 50 as previously described above. Pulses 50 now coherently sum to produce output pulses or beam 54.

Inserted in the optical path of pulses 44 is a single polarization rotator 192, shown positioned between gain elements 20 and coupling means 70. Rotator 192 provides polarization rotation to the pulses so that pulses 50 will pass through polarizing beam splitter 190 and out of laser 110.

An alternative configuration for realizing a laser in accordance with the present invention is illustrated in FIG. 4 where a laser 210 is illustrated. As in the case of FIG. 3 those elements having correspondence with FIG. 1 bear the same numerical designation, such as master oscillator 30, and phase conjugate reflector 80.

In FIG. 4, a polarizing beam splitter 290 is employed as an input means and a series of quarter-wave plates 292 are positioned between gain elements 20 and a lens 270 which acts as coupling means. This combination functions in the same manner as the previously described beam splitter 190 and polarizer 192 combination of FIG. 3, directing pulses 40 into gain elements 20 and pulses 50 out of laser 210. However, in the embodiment FIG. 4, pulses 40 are not collimated until after traversing polarizing beam splitter 290.

In this embodiment, master oscillator 30 is aligned to project pulses 40 directly into the input optical path of laser gain elements 20 rather than relying on beam splitter 290 to redirect pulses 40 by reflection. Instead, beam splitter 290 reflects returning pulses 50 out of laser 210, forming output 54. In this case, a collimator 232 can be placed after beam splitter 290 in order to expand pulses 40. However, note that collimator 232 also effects focusing on the returning, amplified radiation so that output 54 has a smaller cross-section area than the total aperture area of gain elements 20.

A series of reflectors or mirrors 262 are employed as transfer means in FIG. 4 for intercepting portions of pulses 40 and directing them as pulses 42 to gain elements 20.

EXAMPLE

Figure 5:
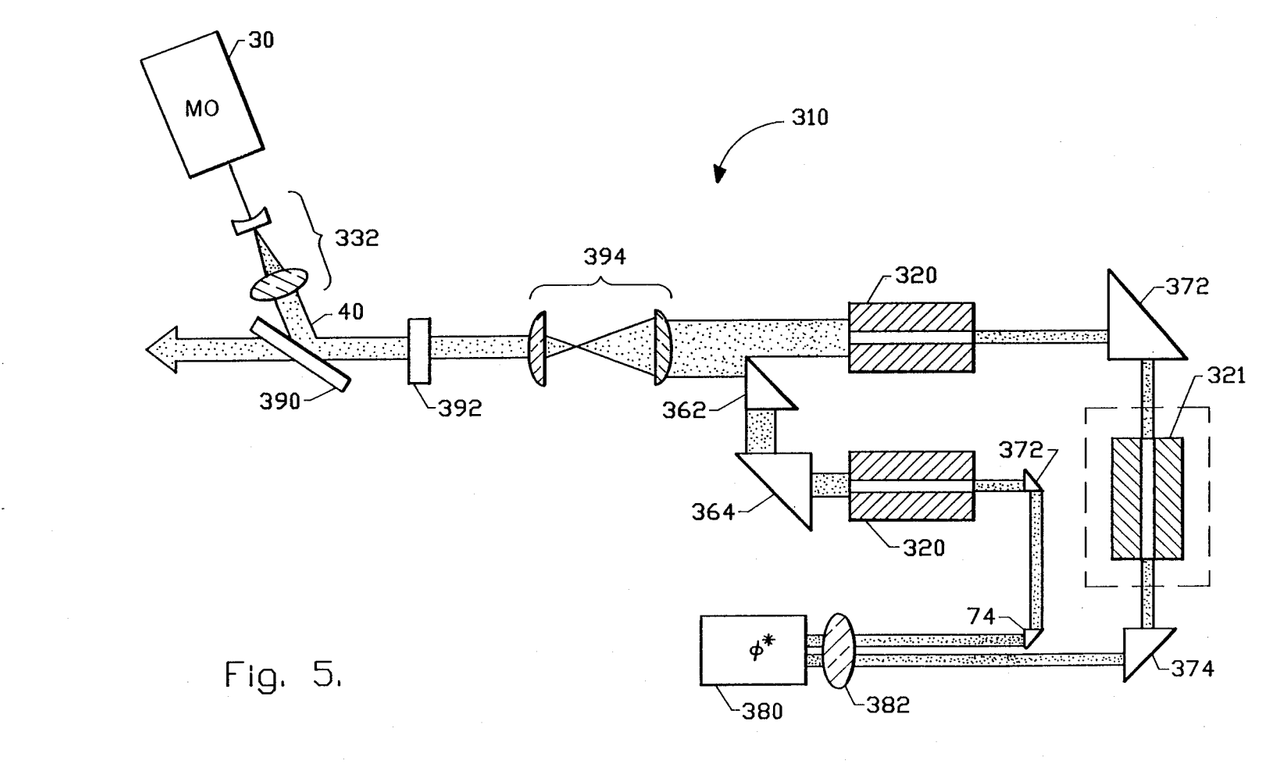
FIG. 5 illustrates a third embodiment of the laser of FIG. 1 used to verify operation, utilizing prisms.

The principles of the invention were demonstrated in the embodiment illustrated in FIG. 5.

For this embodiment, laser gain elements 320, in a laser 310, were driven by the pulses of radiation 40 from master oscillator 30. The pulses were expanded using a telescopic element 332 before being directed toward laser gain elements 320 by a polarizing beam splitter 390. A cylindrical telescope 394 was also used to expand the pulses 40 in one dimension (elliptical) so that the entire beam was large enough to fill both input apertures 320. A quarter-wave plate 392 was positioned adjacent to splitter 390 to rotate polarization of the returning amplified pulses.

A series of reflective prisms 362, 364 and 372, 374, were used as transfer means 60 and coupling means 70, respectively, for directing radiation pulses in and out of gain elements 320.

Prism 362 was positioned within the path of collimated pulses 40 in order to intercept a portion thereof for redirection to a single gain element 320. It is apparent that more than one prism 362 can be placed about the perimeter of the optical path of pulses 40 in order to intercept a predetermined portion of the pulses and direct them to other gain elements. This includes, as before, not only gain elements in the same plane as that of FIG. 5, but also gain elements positioned in adjacent planes. After prism 362, there was positioned a prism 364 for reflecting the redirected pulses 40 into gain elements 320.

Pulses 40 were then amplified in laser gain elements 320 which were Nd:YAG crystals mounted in commercial laser heads, each incorporating two flash lamps. Amplified pulses from gain elements 320 were reflected by coupling prisms 372 and 374 to a phase conjugate reflector 380. A focusing lens 382 was used to focus the pulses into phase conjugate reflector 380 in order to reach threshold and preserve a maximum amount of the total beam energy. Then the phase conjugate of pulses 46 retrace the steps, going through polarizer 392, splitter 390 and exiting laser 310.

FIG. 5 further illustrates an additional gain element 321 positioned in series with gain elements 320 in order to provide additional amplification for higher average power without adding to the overall cross-sectional area of the output pulses. This may be required for amplifiers having storage limitations for the pulse length desired, depletion, thermal stress, etc. However, additional elements 321 are not required and were not used in the actual application.

The apparatus of FIG. 5 (without element 321) achieved the desired coherent coupling of gain elements 320 and produced an improved far-field energy distribution pattern.

Thus, what has been described is a method and apparatus for achieving coherent coupling of laser gain media operating in parallel to produce a high brightness output.

The invention and embodiments described so far provide a method and apparatus for the coherent summing of multiple laser gain elements in order to produce a high brightness laser source. However, further advantages over previous lasers and laser techniques are realized with the use of specific types of media or physical configurations.

For solid-state laser gain media, further advantages in terms of size, pumping energy and efficiency are achieved by positioning the gain media physically adjacent and forming a more compact structure. In such a configuration, smaller bright lasers, possibly portable, can be manufactured. Therefore, improving on the method and apparatus described above, individual crystals of solid-state laser materials are joined together to form a single monolithic array. Such a monolithic array is illustrated in FIG. 6.

Figure 6:
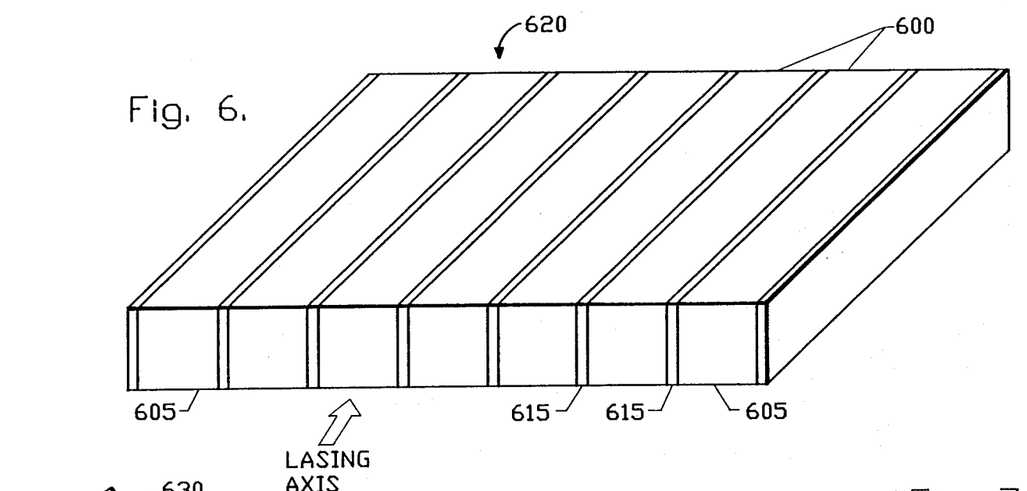
FIG. 6 illustrates laser gain media comprising an array of solid-state crystals.

In FIG. 6, a series of individual gain elements 600 are secured together to form a monolithic gain element 620. For purposes of clarity, only a 1×M array is illustrated. The individual gain elements 600 can comprise a variety of solid-state laser materials such as, but not limited to Cr:Nd:GSAG, alexandrite, Nd:YAG, Nd:YLF, Nd:YA10, Co:MgF$_2$, Ti:sapphire, or neodymium doped glasses with Nd:YAG being a preferred medium. These materials are useful laser materials that suffer from the previously discussed volume or thermal constraints and are not useful in forming large volume laser amplifiers.

The crystals can be joined together by one of several techniques, such as by a supporting frame having edge stops abutting the sides of outer crystals 605 and clamping them against the inner crystals. Successive layers of gain elements 620 can then be secured together utilizing a set of brackets clamping exterior layers to inner layers with fasteners such as bolts. Any such frame or structure must leave sufficient unobstructed access for pumping radiation for the solid-state media used.

A more preferred approach is to use crystals having an approximately rectangular or square cross-section, as shown in FIG. 6, and joining the crystals together with an adhesive or bonding agent. The bonding agent is preferably compliant, so that it does not transmit stress between adjacent elements. In this embodiment, the present invention provides an advantage over single large crystal gain elements in energy scaling. An additional factor limiting the volume of solid-state media that can be used is the amount of induced stress. Normally, the power that can be put into a given volume of crystal or glass is limited by the piece breaking from stress. Smaller square cross-section pieces joined together with a pliant material have less internal stress than a single crystal of the same overall cross-section.

However, there are no geometric requirements for the shape of the crystals other than manufacturing convenience. For crystals that are not shaped in a rectangular cross-section but either circular or multisided geometry such as hexogonal, the crystals may be positioned in interlocking rows such as in a beehive shape. In such a configuration, the crystals can be surrounded by a frame or series of straps or bands that act to hold the crystals together. However, such complex shapes present thermal stress and possible laser excitation pumping problems and are not generally preferred. While the solid-state gain element of FIG. 6 improves the size and pumping area of the laser, placing individual gain elements 600 directly adjacent to each other without intervening structure such as reflectors, housings, flashlamps, etc., can increase ASE and parasitic mode problems. Such ASE will have deleterious effects on the laser output as previously discussed.

ASE in the individual crystals is not the only problem for a monolithic element 600. Because of the adjacent media, ASE radiation can be amplified as it traverses across successive crystal barriers and through each crystal. Therefore, means are needed to inhibit lasing modes that are not substantially parallel to the main lasing mode of the crystals.

One solution is to place an absorbing material on the exterior of the crystals before bonding. This might be accomplished by doping the bonding agent with a material such as BDN (Bis(4-Dimethylaminodithiobenzil) Nickel) which is used for the manufacture of laser Q-switching elements. Such a material effectively absorbs radiation at predeterminned wavelengths. If the bonding agent for joining gain elements 600 is to be applied in a very thin layer and/or can not be admixed with a proposed absorber chemical then alternatively a separate layer of material, such as samarium doped glass, is inserted between the gain elements in making array 620. Sm:glass elements 615 are shown in the monolithic array 620 of FIG. 6, where they absorb energy at the principal fluorescence of neodymium.

The physical sizing of the individual amplifiers is not critical to the overall laser as previously discussed. One concern, however, as previously memtioned, is to provide for thermal stress which can occur during operation, especially with many crystals having differing dimensions or stress properties. While the use of an array of smaller crystals provides an advantage in the relief of stress, spacers (not shown) can also be inserted in the array between adjacent gain elements 600 in order to absorb or dissipate some of the stress.

Figure 7:
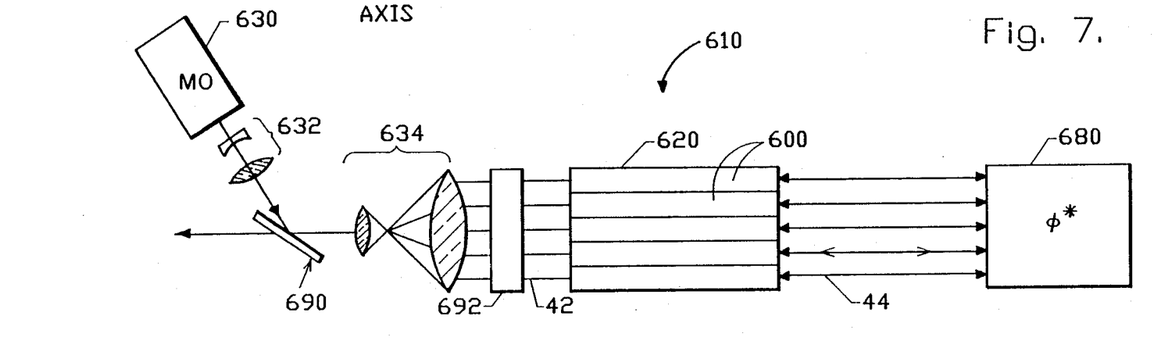
FIG. 7 illustrates a high brightness laser according to the principles of the invention utilizing solid-state crystal laser gain elements.

Once constructed, the solid-state laser array 620 is positioned in a laser such as illustrated in FIG. 7. Laser 610 uses a master oscillator 630 for driving array 620 which is preferably an Nd:YAG laser source.

Collimation means 632 expands pulses 40 provided by the master oscillator so that a small aperture pulse source can be effectively coupled to a larger amplifier array. The pulses would be enlarged to an elongated eliptical cross-section in order to drive a 1×M array of gain elements 620. Larger N×M arrays may use more circularly expanded pulses.

Polarizing beam splitter 690 directs pulses 40 into array 620 where they are amplified and emerge from the other side of array 620 as pulses 44. These pulses are directed to phase conjugation means 680 where the phase conjugate is returned to array 620.

A polarization rotating element 692 modifies the polarizaiton of the amplified pulses 48 so that they are directed out of laser 610 by beam splitter 690. There is no requirement that the polarization state modification takes place at the location illustrated and polarization alteration element 692 can be positioned between array 620 and phase conjugation means 680.

Laser 610, therefore, comprises a compact laser gain medium array whch can provide a high brightness output at a reduced size and possible reduced pumping energy.

In the area of diode lasers, additional advantages in terms of size and high brightness can be achieved by employing a compact structure of parallel gain elements.

As discussed in the background, present approaches to the coupling of laser diodes include the use of evanescent coupling, where evanescent fields overlap in a medium between adjacent laser channels. However, aside from the previously discussed problems with phase shifted modes, additional problems arise in this approach.

First, the intermediate medium between adjacent laser channels can be lossy, absorbing energy residing in that region which decreases energy for the output. Where the evanescent fields have a high degree of overlap, there is a larger amount of energy present in the lossy region lowering the average or peak power of the output. For modes in which the evanescent fields are 180 degrees out of phase, the loss in the intermediate region is lower but the far-field output is poor and it is the far-field output that is important for various commercial or military applications.

A second problem arises in that there is a limit to how many adjacent channels can be effectively coupled using the evanescent fields. The precise limit depends on the structure of the diode aray, but very large arrays, as required to achieve very high brightness, appear to be unfeasible.

Another problem of laser diodes is that there is a limit to the energy density accommodated by the diode apertures before physical damage insues. This onset of damage is another limitation to the amount of energy that can be output by conventional laser diodes.

By using the method of the present invention, the limits on evanescent coupling and phase shifted modes are overcome by a diode laser structure which greatly reduces complexity and increases the energy output without aperture damage.

Figure 8:
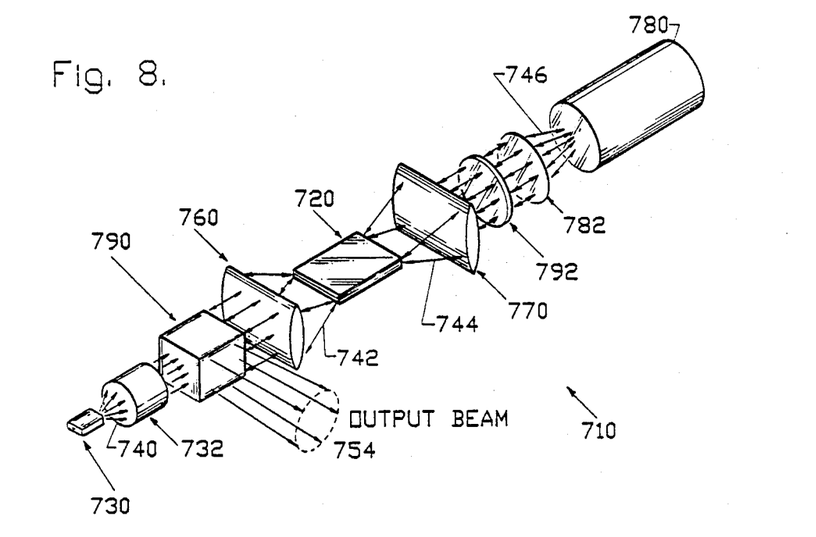
FIG. 8 illustrates a high brightness laser according to the invention utilizing a diode laser array gain element.

In FIG. 8, a laser 710 is illustrated employing an array 720 of diode lasers 700 as the parallel laser gain elements. The laser diodes are employed as amplifiers in a MOPA configuration similar to that of FIG. 3. Here, the diodes are driven by a single master oscillator source 730 and not used as individual oscillator lasers. This means that diodes 700 are generally provided with low internal reflectivity apertures so that radiation passes through the diode cavities during amplification rather than oscillating as in a resonant cavity. This can be accomplished by application of anti-reflection coatings.

In this embodiment, master oscillator 730 delivers pulses of radiation 740 to the diode laser array 720 through a collimator 732, polarizing beam splitter 790, and cylindrical lens 760. In many applications, laser 710 is operated in a CW mode; however, it is necessary to dissipate heat during operation and at higher energy densities, this becomes a limitation. Therefore, for clarity in illustration, the present embodiment is described utilizing a pulsed mode of operation.

Master oscillator 730 can comprise a variety of coherent radiation sources known in the art such as, but not limited to, another diode laser. The use of a diode laser as master oscillator 730 is preferred since this allows for a more compact laser 710 as further discussed below.

Pulses 740 leaving master oscillator 730 are expanded or collimated using a telescopic element 732 in order to provide a beam having sufficient cross-sectional area to engage diode array 720. This is done because master oscillator 730 provides a high quality near diffraction limited beam that is smaller than the total area of the amplifying apertures. Also, if a diode laser is employed as master oscillator 730, there may be problems associated with a widely divergent output from the very small aperture. This known phenomenon limits the brightness of master oscillator 730 due to the large angle subtended by its output. Intermediate, telescopic elements employed as part of collimator 732 alleviate this divergence.

In addition, it is important to achieve saturation of the diode laser gain elements when amplifying pulses 740 and 746. This is desired in order to provide an efficient, high energy output by coupling as much energy into amplified pulses 750 as possible. If the gain elements operate below satuation, then laser 710 may provide a diffraction limited beam having insufficient brightness. For this reason, it is desirable to provide a master oscillator having high enough energy to saturate the gain elements 700. It is also desirable to minimize the divergence of pulses when using a diode laser as master oscillator 730. Alternatively, if one laser using an array of gain elements produces a near diffraction limited, high energy beam that is not bright enough, it can be used as a master oscillator for another laser to provide saturation of the appropriate gain elements and high brightness output.

Pulses 742 enter the diode array 720 where they are amplified and exit the diode array as pulses 744. Pulses 744 are refocused using a cylindrical lens 770 and pass through a quarter-wave plate 792 before being further focused by a lens 782 into phase conjugation means 780. Again, the use of a quarter-wave plate in order to modify the polarization state of the pulses is appropriate for some types of phase conjugation processes such as SBS. This type of process does not alter the polarization state of the input pulses. However, other processes and methods such as four-wave mixing can alter the polarization state of the input pulses, requiring an alternate polarization modification technique.

After conjugation, pulses 746 return to the diode array 720 where they are further amplified and exit through lens 760. Since a quarter-wave plate was inserted into the path of the pulses, they are now both amplified and polarization rotated so that polarizing beam splitter 790 reflects pulses 750 out of laser 710 as output beam 754.

The diode laser array 720 can comprise a variety of diode laser media. A series of individual diodes and their associated voltage leads, etc., could be secured in a frame in order to form an array 720. Another technique would be to manufacture a series of diode channels on single substrates to form 1 by M arrays.

Conventional diode lasers comprise at least three layers of material such as $Al_xGa_{1-x}As$ on a substrate such as GaAs. By controlling the aluminum and gallium concentrations or material composition of each layer, the indexes of refraction for the layers are tailored to confine radiation in the middle layer. Additionally, layers of material can then be used to provide electrical contracts for powering the diode as a laser. More detailed discussions and information on diode laser construction and operation can be found in "Heterostructure Lasers" by H. C. Casey, Jr. and M. B. Panish, *Academic Press*, 1978.

In order to reduce lasing along undesired axes and driving current requirements, as well as other properties, typical diode lasers are "channeled." Channeling is where a waveguiding region is induced in the laser medium to confine laser modes to a centrally located narrow volume. This is accomplished by a variety of techniques in which waveguiding ridges or current carrying guide strips are deposited as part of the laser diode structure. A multiple array of conventional diodes, therefore, comprises an array of such channels which further comprises an array of ridges or current strips. A different method of manufacture is contemplated by the present invention.

Figure 9:
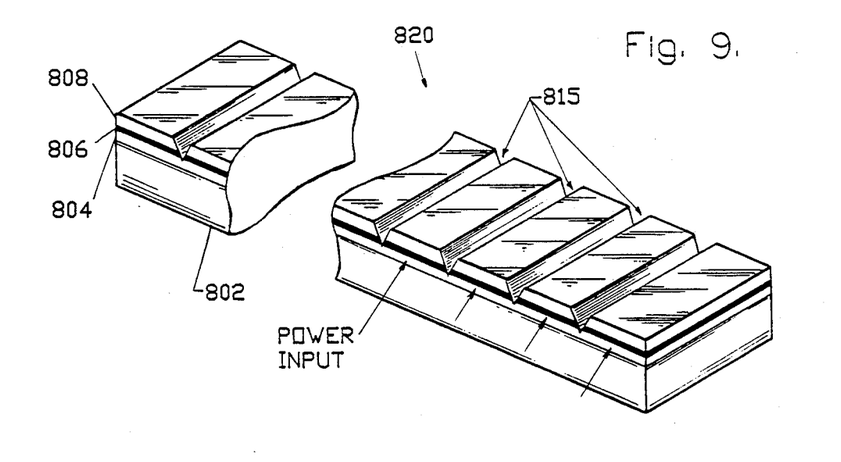
FIG. 9 is a perspective view of a laser diode array gain element.

In the present invention, as further illustrated in FIG. 9, three material layers 804, 806 and 808 are deposited on a substrate 802 to form a diode laser array 820. The materials comprising layers 804, 806, 808 can be laser materials such as, but not limited to, $Ga_xIn_{1-x}$, $P_yAs_{1-y}$ or $Al_xGa_{1-x}As$. A typical substrate 802 material would be GaAs. The material of layers 804, 806, 808 can be deposited on substrate 802 by several techniques including metal organic chemical vapor deposition (MOCVD), molecular beam epitaxy (MBE) or liquid phase epitaxy (LPE). Layer 806 is deposited to a thickness on the order of 0.1 μm as is typical of laser diodes, although other dimensions can be used dependent upon the application.

In the configuration illustrated in FIG. 9, the entire layer 806 is allowed to lase. No additional waveguiding ridges or current carrying strips are used to narrow the lasing region down to a series of small channels. Conventional AlGaAs diode lasers have exhibited lifetimes on the order of 10,000 hours when operating at extraction power densities on the order of 10 kW per $cm^2$. Therefore, the large aperture for the laser of the present invention could provide output beams having peak powers on the order of 10 kW or larger. At the same time, the output power is distributed over a large aperture preventing aperture damage at high energies.

The overall width and length of layers 804, 806, 808 are not otherwise critical except for the previously discussed parasitic modes and ASE. Dimensions on the order of 1 to 2 mm are reasonable to prevent ASE from depleting regions in the lasing material and substantially degrading the output. This dimension is dependent upon the lasing material and doping levels chosen. Therefore, layers 804, 806, 808 are deposited on a substrate 802 that is on the order of 2 mm long when measured parallel to the desired lasing axis. However, substrate 802 and layers 804, 806, 808 are deposited in widths (perpendicular to the lasing axis) on the order of several millimeters to provide a very large aperture output beam which is coherently summed to form a single output beam.

In order to reduce ASE modes across the width dimension of diode laser array 820, a groove or gap 815 is formed through layers 804, 806, 808 for optical isolation of adjacent laser material regions.

Such a groove can be constructed by several methods such as ion beam etching or masking and chemical etching. The dimensions of groove 815, depth and width, are dependent upon the stored energy between successive grooves. The higher the energy stored, then the wider the isolation distance must be. The grooves must prevent optical coupling of parasitic modes or ASE across separate regions of the media of layer 806. An examplary setup might include grooves spaced approximately 1 mm or less apart.

Therefore, diode array 820 comprises an array of diode laser apertures distributed across a common substrate 802. For purposes of illustration only, diode array 820 is shown as a uniplanar structure. Several substrates 802 with associated layers 804, 806, 808 can be positioned to form a two dimensional N by M array of diode apertures.

As previously discussed, it is preferable to use a laser diode for master oscillator 730 in constructing a high brightness laser 710. A first advantage arises in that the operating wavelength of laser 710 can be selectively tuned by altering the injection current for the diodes.

A second advantage is that by using elements constructed from semiconductor materials along with integrated optical circuit techniques, the entire laser laser 710 may be constructed on a single substrate. In this application, lenses may be manufactured in the form of planar optical waveguide structures similar to the commonly used geodesic lenses; waveguides can be used to couple the pulses from master oscillator 730 into and out of laser diode array 720; and other waveguide structures employed as phase conjugation means.

Figure 10:
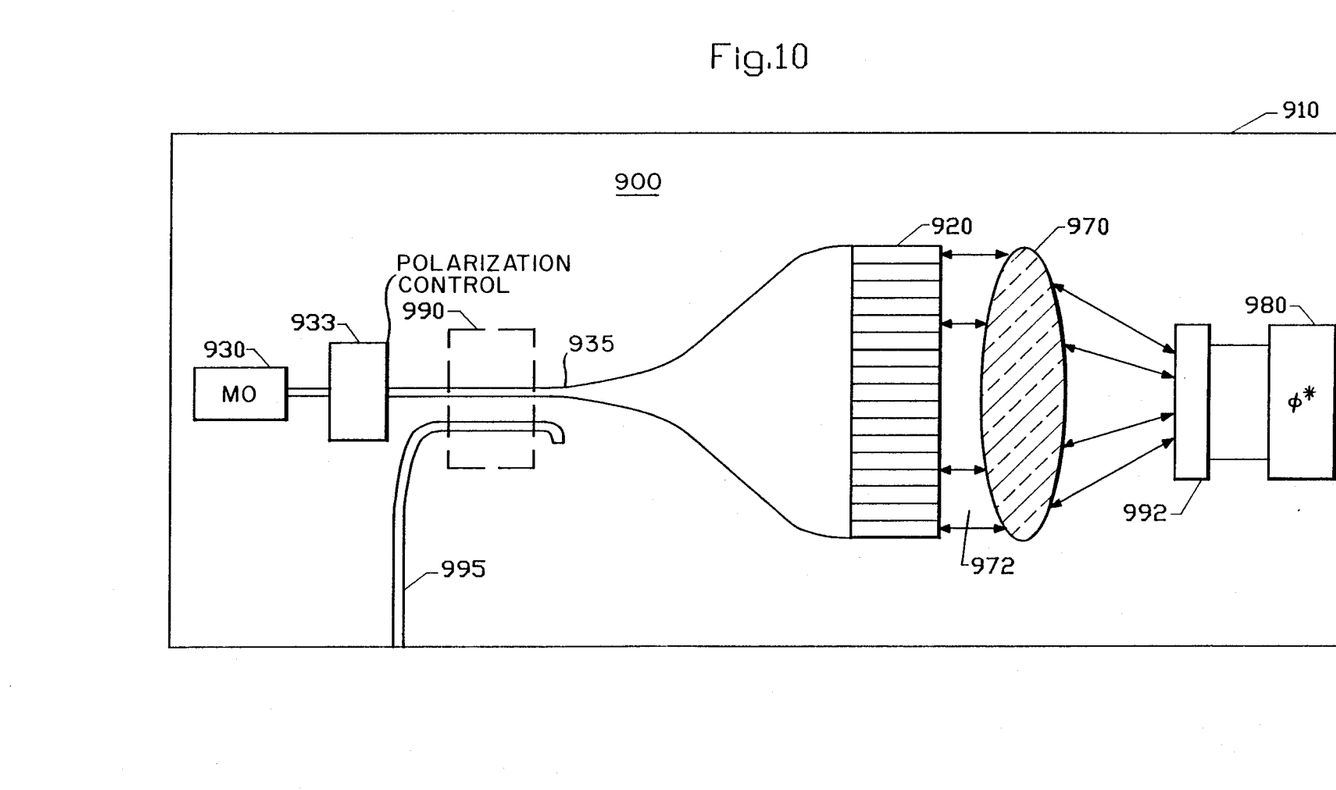
FIG. 10 is a diagrammatic view of a laser according to the invention disposed on a integrated circuit substrate.

FIG. 10 shows a simplified diagramatic illustration of a laser 910 constructed according to the above principles on a large semiconductor wafer. In FIG. 10, the master oscillator diode laser 930 includes the required material layers deposited on a substrate 900. Diode laser 930 provides pulses that are directed to the amplifying laser diode array 920, also deposited on substrate 900, by a tapering planar waveguide 935. Waveguide 935 is deposited as a series of optically transmissive material layers on substrate 900. In the alternative, a lens can be used to couple the pulses into array 920. The pulses are amplified, exiting the diodes where a lens 970 directs them to a phase conjugation means 980. The lens is formed by a depression in the substrate beneath a planar waveguiding region 972.

Deposited between phase conjugation means 980 and lens 970 is a polarization modification means 992 which alters the polarization of the pulses being amplified. Between master oscillator laser diode 930 and diode array 920 is a directional coupler 990 which switches energy out of laser 910 along waveguide 995 dependent upon the polarization of the pulses traversing the coupler. A polarization control means 933 can also be used to initially polarize pulses from master oscillator 930.

Phase conjugation means 980 can also be constructed as an adjoining wavedguide which could be a hollow core waveguide filled wilth a fluid medium that undergoes SBS or SRS processes. Alternatively, several types of glass optical waveguide fibers exhibit SBS or four-wave mixing phenomena for sufficent radiation intensities. In the present invention, the radiation is produced at, and focused down to, small aperture sizes so that SBS and SRS thresholds are easily reached.

In this later configuration, a polarization rotation means such as a quarter-wave plate can be positioned at the interface of the fiber and the remaining waveguide structure in order to provide polarization modification.

Thus, a high brightness laser source 910 provides a high energy, diffraction limited output from a very compact apparatus.

The foregoing descriptions of preferred embodiments have been presented for purposes of illustration and description. They are not intended to be exhaustive nor to limit the invention to the precise forms disclosed, and many modifications and variations are possible in light or the above teaching. The embodiments were chosen and described to explain best the principles of the invention and its practical application, thereby to enable others skilled in the art to best utilize the invention in various embodiments and with various modifications as are suited to the particular use contemplated. It is intended that the scope of the invention be defined by the claims and their equivalents.

What is claimed is:

1. A laser comprising:
    a phase coherent master oscillator radiation source;
    a plurality of laser gain elements positioned in a operationally parallel configuration with each amplifier having first aperture means for receiving unamplified radiation from said master oscillator and transmitting amplified radiation and having second aperture means for transmitting noncoherent amplified radiation and receiving its phase conjugate;
    input means for coupling a predetermined portion of unamplified radiation from said master oscillator to said first aperture means of each of said gain elements;

phase conjugate reflector means operatively coupled to said second aperture means of each of said gain elements for reflecting the phase conjugate of radiation leaving said second aperture means of each said amplifiers back to said respective second aperture means; and output coupling means for coupling coherent amplified radiation from said plurality of gain elements transmitted by each of said first aperture means out of said laser as a phase coherent output beam of radiation.

2. The laser of claim 1 further including collimation means positioned so as to expand the radiation beam from said master oscillator so as to be intercepted by all of said first aperture means.

3. A laser of claim 1 wherein said input means comprises a polarizing beam splitter.

4. The laser of claim 3 wherein said output coupling means comprises polarization modification means for modifying the polarization state of the amplified radiation transmitted by each of said first aperture means with respect to the unamplified input radiation received thereby so as to cause said amplified radiation to be directed out of said laser by said polarizing beam splitter.

5. The laser of claim 4 wherein said polarization modification means comprises a quarter-wave plate.

6. The laser of claim 4 wherein said polarization modification means comprises a Faraday rotator.

7. The laser of claim 1 wherein said laser gain elements are positioned so as to form a two dimensional array.

8. The laser of claim 1 further comprising focusing means for focusing the radiation from each of said second aperture means into said phase conjugate reflector means.

9. The laser of claim 1 wherein said phase conjugate reflector means comprises means for producing stimulated Brilluoin scattering.

10. The laser of claim 1 wherein said phase conjugate reflector means comprises means for producing four wave mixing.

11. The laser of claim 1 wherein said input means comprises a plurality of highly reflective surfaces aligned so as to direct predetermined portions of said unamplified radiation to each of said first aperture means.

12. The laser of claim 1 further comprising conjugate transfer means, for coupling radiation between said second aperture means and said phase conjugate reflector means, disposed along the optical path between each of said second aperture means and said phase conjugate reflector means.

13. The laser of claim 12 wherein said phase conjugate transfer means comprises a plurality of reflective prisms arranged so as to intercept radiation from each of second aperture means and reflect said radiation into said phase conjugate reflector means.

14. The laser of claim 13 further comprising focusing means for focusing amplified radiation from said phase conjugate transfer means into said phase conjugate reflector means.

15. The laser of claim 1 further comprising focusing means for focusing amplified radiation from said second aperture means into said phase conjugate reflector means.

16. A solid-state laser comprising:
a phase coherent master oscillator radiation source;
a plurality of solid-state laser gain elements positioned in a operationally parallel configuration with each gain element having first aperture means for receiving unamplified radiation from said master oscillator and transmitting amplified radiation and having second aperture means for transmitting noncoherent amplified radiation and receiving its phase conjugate;

input means for coupling a predetermined portion of unamplified radiation from said master oscillator to said first aperture means of each of said gain elements;

phase conjugate reflector means operatively coupled to said second aperture means of each of said gain elements for reflecting the phase conjugate of radiation leaving said second aperture means of each said gain elements back to said respective second aperture means; and output coupling means for coupling coherent amplified radiation from said plurality of gain elements transmitted by each of said first aperture means out of said solid-state laser as a phase coherent output beam of radiation.

17. The laser of claim 16 wherein said plurality of solid-state gain elements further comprise an array of solid-state laser crystals configured as a single monolithic gain structure.

18. The laser of claim 17 werein said solid-state laser crystals are chosen from the group comprising alexandrite, Nd:YAG, Nd;YLF, Nd:YA10, Co:MgF2, or Ti:-sapphire.

19. The laser of claim 17 further comprising a compliant bonding material disposed between each of said laser crystals so as to provide said monolithic gain structure.

20. The laser of claim 19 further comprising isolation means disposed between each of said laser crystals for substantially preventing the optical coupling of radiation generated by means of amplified spontaneous emission between adjacent gain elements in said monolithic gain structure.

21. The laser of claim 20 wherein said isolation means comprises a material for absorbing radiation at the operating wavelength of radiation generated by means of amplified spontaneous emission in said laser crystals.

22. The laser of claim 20 wherein said isolation means comprises a layer of high quality glass doped with a radiation absorbing material.

23. The laser of claim 16 further comprising spacing means between said gain elements so as to provide heat dissipation channels.

24. The laser of claim 16 further including collimation means positioned so as to expand the radiation beam from said master oscillator so as to be intercepted by all of said first aperture means.

25. The laser of claim 24 wherein said output coupling means comprises polarization modification means for modifying the polarization state of the amplified radiation transmitted by each of said first aperture means with respect to the unamplified input radiation so as to cause said amplified radiation to be directed out of said laser by said polarizing beam splitter.

26. The laser of claim 16 wherein said phase conjugate reflector means comprises means for producing stimulated Brilluoin scattering.

27. The laser of claim 16 further comprising conjugate transfer means, for coupling radiation between said second aperture means and said phase conjugate reflector means, disposed along the optical path between each of said second aperture means and said phase conjugate reflector means.

28. The laser of claim 27 further comprising focusing means for focusing amplified radiation from said conjugate transfer means into said phase conjugate reflector means.

29. A diode laser comprising:
a phase coherent master oscillator radiation source;
an array of laser diode gain elements disposed in a substantially parallel configuration with each diode gain element havng first aperture means for receiving unamplified radiation from said master oscillator and transmitting noncoherent amplified radiation and receiving its phase conjugate;
input means for coupling a predetermined portion of unamplified radiation from said master oscillator to said first aperture means of each of said laser diode gain elements;
phase conjugate reflector means operatively coupled to said second aperture means of each of said laser diode gain elements for reflecting the phase conjugate of radiation leaving said second aperture means of each of said laser diode gain elements back to said respective second aperture means; and
output coupling means for coupling coherent amplified radiation from said plurality of laser diode gain elements transmitted by each of said first aperture means out of said diode laser as a phase coherent output beam of radiation.

30. The laser of claim 29 wherein said array of laser diode gain elements further comprises:
first, second, and third material layers disposed on a substrate with the second of said layers being capable of supporting laser radiation upon excitation by a pumping current applied across all three of said layers and having the indexes of refraction of each of said layers controlled so as to confine optical radiation in said second layer; and
optical isolation grooves which extend through all three of said layers to said substrate for optically isolating regions of said second layer into adjacent regions having separate apertures, said grooves being disposed at substantially regular intervals across the surface of said material layers.

31. The laser of claim 30 wherein said material layers comprise $Al_xGa_{1-x}As$ with the value of x being chosen so that the index of refraction of said second layer is greater than that of said first and thire layers.

32. The laser of claim 30 wherein said material layers comprise $Ga_xIn_{1-x}P_yAs_{1-y}$ with the values of x and y being chosen so that the index of refraction of said second layer is greater than that of said first and third layers.

33. The laser of claim 29 wherein said master oscillator comprises an array of diode gain elements driven by a second master oscillator source with a phase conjugation means operatively coupled to said gain elements so as to return the phase conjugate of amplified radiation thereto wherein it is amplified further and exits said gain elements and is coupled out of said master oscillator by output means.

34. The laser of claim 29 wherein said master oscillator, said array of laser diode gain elements, said input means, said phase conjugate reflector means and said output coupling means are disposed on a single large scale integrated circuit wafer.

35. The laser of claim 29 wherein said phase conjugate reflector means comprises optical fiber waveguides.

36. The laser of claima 35 wherein said output means comprises polarization modification means for modifying the polarization state of the amplified radiation transmitted by each of said first aperture means with respect to the unamplified input radiation so as to cause said amplified radiation to be directed out of said laser by said polarizing beam splitter.

37. The laser of claim 36 further comprising focusing means for focusing amplified radiation from said conjugate transfer means into said phase conjugate reflector means.

38. The laser of claim 16 wherein said input means comprises a polarizing beam splitter.

39. The laser of claim 29 wherein said input means comprises a polarizing beam splitter.

40. The laser of claim 29 further comprising conjugate transfer means, for coupling radiation between said second aperture means and said phase conjugate reflector means, disposed along the optical path between each of said second aperture means and said phase conjugate reflector means.

* * * * *